(12) United States Patent
Klug

(10) Patent No.: US 6,402,576 B1
(45) Date of Patent: Jun. 11, 2002

(54) PLASTIC BALL BEARING SEAT FOR TRIM CYLINDER OF OUTBOARD MARINE ENGINE

(75) Inventor: Carl J. Klug, Auburn Hills, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 09/579,917

(22) Filed: May 26, 2000

Related U.S. Application Data
(60) Provisional application No. 60/136,330, filed on May 27, 1999.

(51) Int. Cl.[7] ............................................. B63H 5/125
(52) U.S. Cl. ........................................................ 440/61
(58) Field of Search ................................. 440/61; 92/249

(56) References Cited

U.S. PATENT DOCUMENTS

| | | | | |
|---|---|---|---|---|
| 3,783,749 A | * | 1/1974 | Cunningham et al. | ........ 92/249 |
| 4,720,278 A | * | 1/1988 | Taguchi et al. | ............... 440/61 |
| 6,057,393 A | * | 5/2000 | Hirai | .......................... 524/414 |

* cited by examiner

Primary Examiner—Ed Swinehart
(74) Attorney, Agent, or Firm—Faegre & Benson LLP

(57) ABSTRACT

A marine engine tilt and trim unit having a trim cylinder with a polymer ball bearing seat. The polymer seat reduced chatter during trim operations.

4 Claims, 6 Drawing Sheets

PLASTIC BALL BEARING SEAT FOR TRIM CYLINDER OF OUTBOARD MARINE ENGINE

REFERENCE TO RELATED APPLICATION

This application claims the benefit of U.S. Provisional Application Serial No. 60/136,330 filed on May 27, 1999 and entitled "Plastic Ball Bearing Seat For Trim Cylinder Of Outboard Marine Engine Tilt And Trim Unit" which is incorporated herein by reference.

FIELD OF THE INVENTION

The present invention is related generally to hydraulic cylinders. In particular, the invention is an improved marine engine trim cylinder.

BACKGROUND OF THE INVENTION

Hydraulic trim systems used with outboard marine (e.g., boat) engines are generally known and in widespread use. Systems of these types include a hydraulic trim cylinder with a trim rod extending therefrom. The trim cylinder is typically mounted to the transom (i.e., rear) of the boat with the distal end of the cylinder rod engaged with a swivel bracket to which the engine is mounted. The trim system is actuated by an operator to extend and retract the cylinder rod to trim (i.e., raise and lower relatively small amounts) the engine. Often, the trim cylinder is part of a larger tilt and trim unit which also includes one or more tilt cylinders for raising and lowering the engine over a larger range of motion.

A ball bearing is sometimes mounted in the end of the trim cylinder rod. In trim units of this type it is the ball bearing that engages the swivel bracket. Unfortunately, when the bearing dries out or corrodes it sometimes will not roll smoothly within its seat during trim operations. Under these circumstances the operator can experience an annoying chatter sound.

There remains, therefore, a need for improved marine engine tilt systems. In particular, there is a need for tilt systems which are not susceptible to the chatter sometimes present in known systems of this type. To be commercially viable, any such system should also be capable of being efficiently manufactured.

SUMMARY OF THE INVENTION

The present invention is a marine engine hydraulic trim cylinder which has a reduced susceptibility to chatter of the type sometimes produced by conventional cylinders of this type. The cylinder can also be efficiently manufactured. These features and advantages are provided by the use of a polymer seat for the ball at the end of the cylinder rod. In one embodiment of the invention the ball seat is formed from polyphenylene sulfide (PPS). Trim cylinders with polymer ball seats in accordance with the invention can also be incorporated into tilt and trim units.

DETAILED DESCRIPTION OF THE PREFERRED EMBODIMENTS

Figure 1:
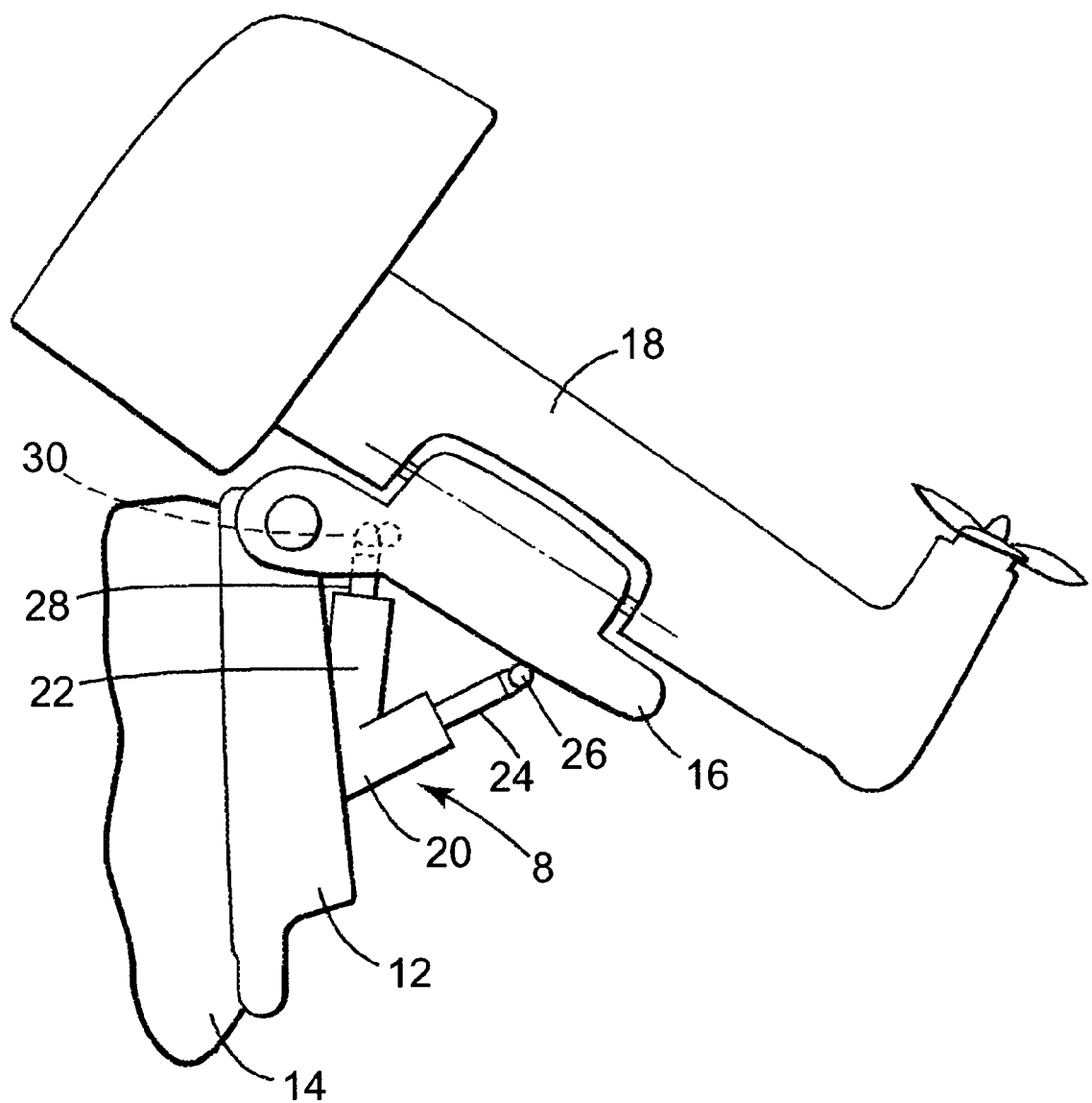
FIG. 1 is a side view of tilt and trim system including a trim cylinder in accordance with the present invention mounted to the transom of a marine vehicle having an outboard engine.

FIG. 1 is an illustration of a tilt and trim unit 8 in which the polymer trim cylinder ball seat 10 of the present invention (not visible in FIG. 1) can be incorporated. As shown, the tilt and trim unit 8 is mounted to the transom 12 of a boat 14 (i.e., a marine vehicle). The tilt and trim unit 8 is operated to raise and lower a swivel bracket 16 to which an outboard engine 18 is mounted. With the exception of the polymer ball seat 10, the tilt and trim unit 8 can be conventional in design and operation. Tilt and trim units 8 are, for example, commercially available from Parker-Hannifin Corporation's Oildyne division in Minneapolis, Minn. The embodiment of the tilt and trim unit 8 shown in FIGS. 1 and 7–9 includes two hydraulic trim cylinders 20, each located on opposite sides of a hydraulic tilt cylinder 22. The trim cylinders 20 each have a rod 24 with a metal ball bearing 26 at the end of the rod. The tilt cylinder 22 has a rod 28 with a mounting bracket 30 at the end of the rod. A hydraulic fluid reservoir 32 and pump system 34 are also part of the tilt and trim unit 8. In operation, the tilt cylinder 22 is operated to drive the swivel bracket 16 and engine 18 over relatively long ranges of travel (e.g., when configuring the engine for trailering). The trim cylinders 20, on the other hand, are operated to drive the swivel bracket 16 and engine 18 over relatively short distances to adjust the attitude of the boat 14 as it is traveling through the water.

Figure 2:
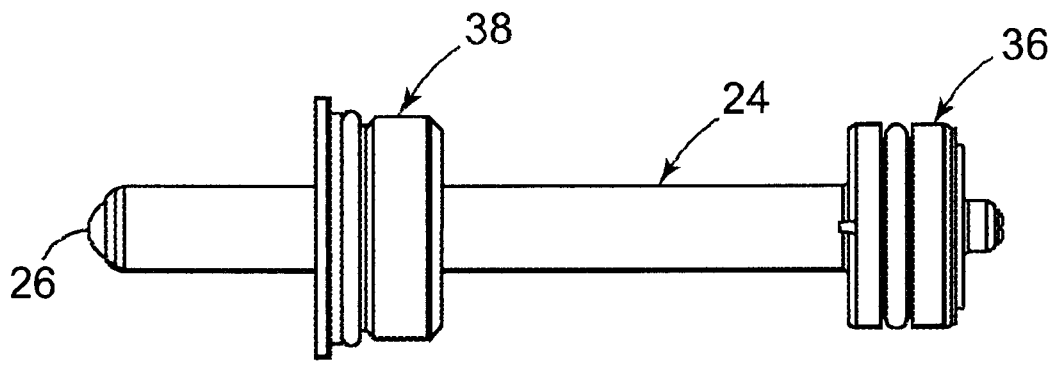
FIG. 2 is a detailed view of the rod of the trim cylinder shown in FIG. 1.
Figure 3:
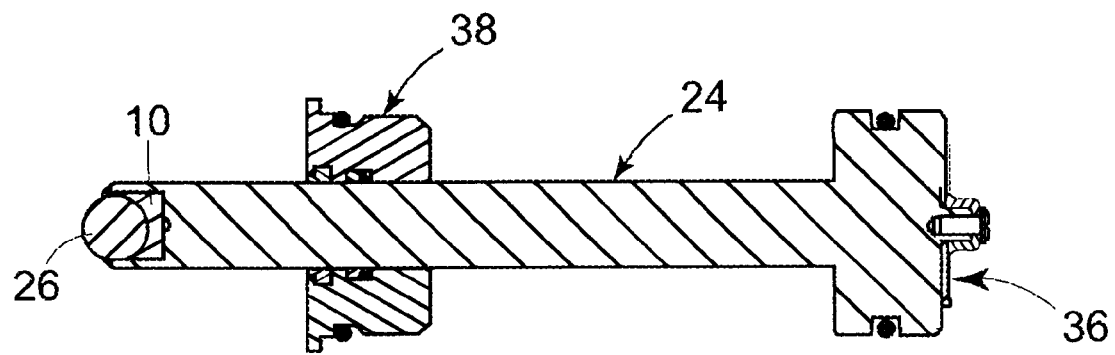
FIG. 3 is a sectional view of the rod shown in FIG. 1, illustrating the polymer bearing seat of the present invention.
Figure 5:
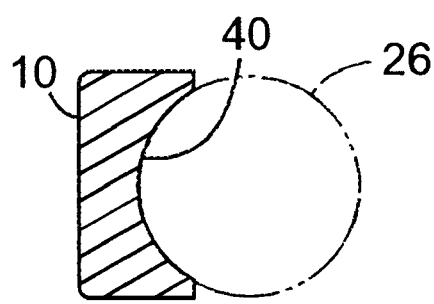
FIG. 5 is a sectional view of the ball seat taken along line 5—5 in FIG. 4, and illustrating a ball in phantom.
Figure 4:
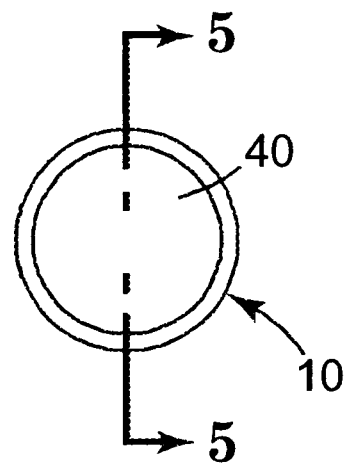
FIG. 4 is an end view of the ball seat shown in FIG. 3.
Figure 6:
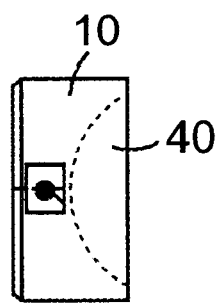
FIG. 6 is a side view of the ball seat shown in FIG. 4.
Figure 7:
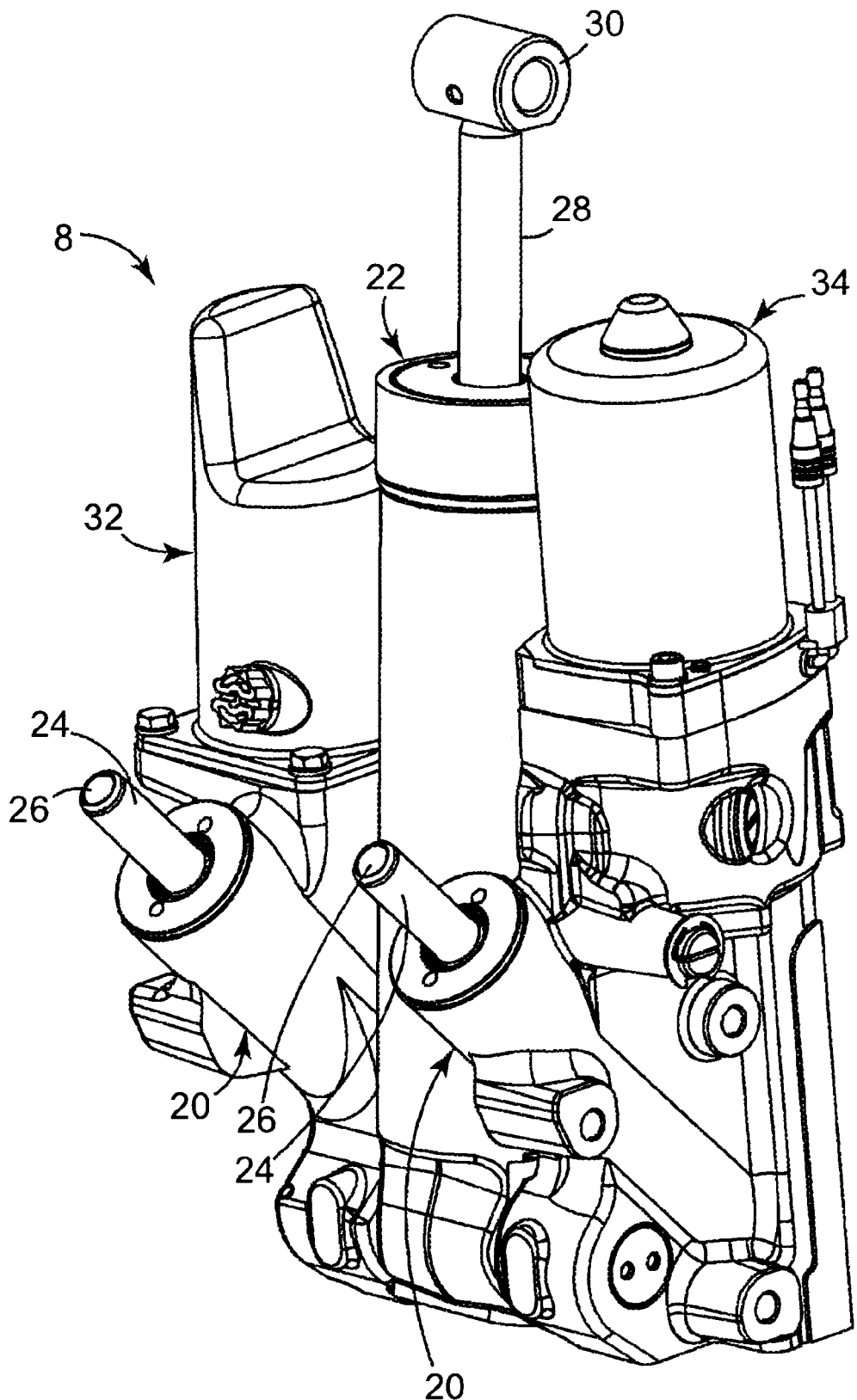
FIG. 7 is a first isometric view of the tilt and trim unit shown in FIG. 1.
Figure 8:
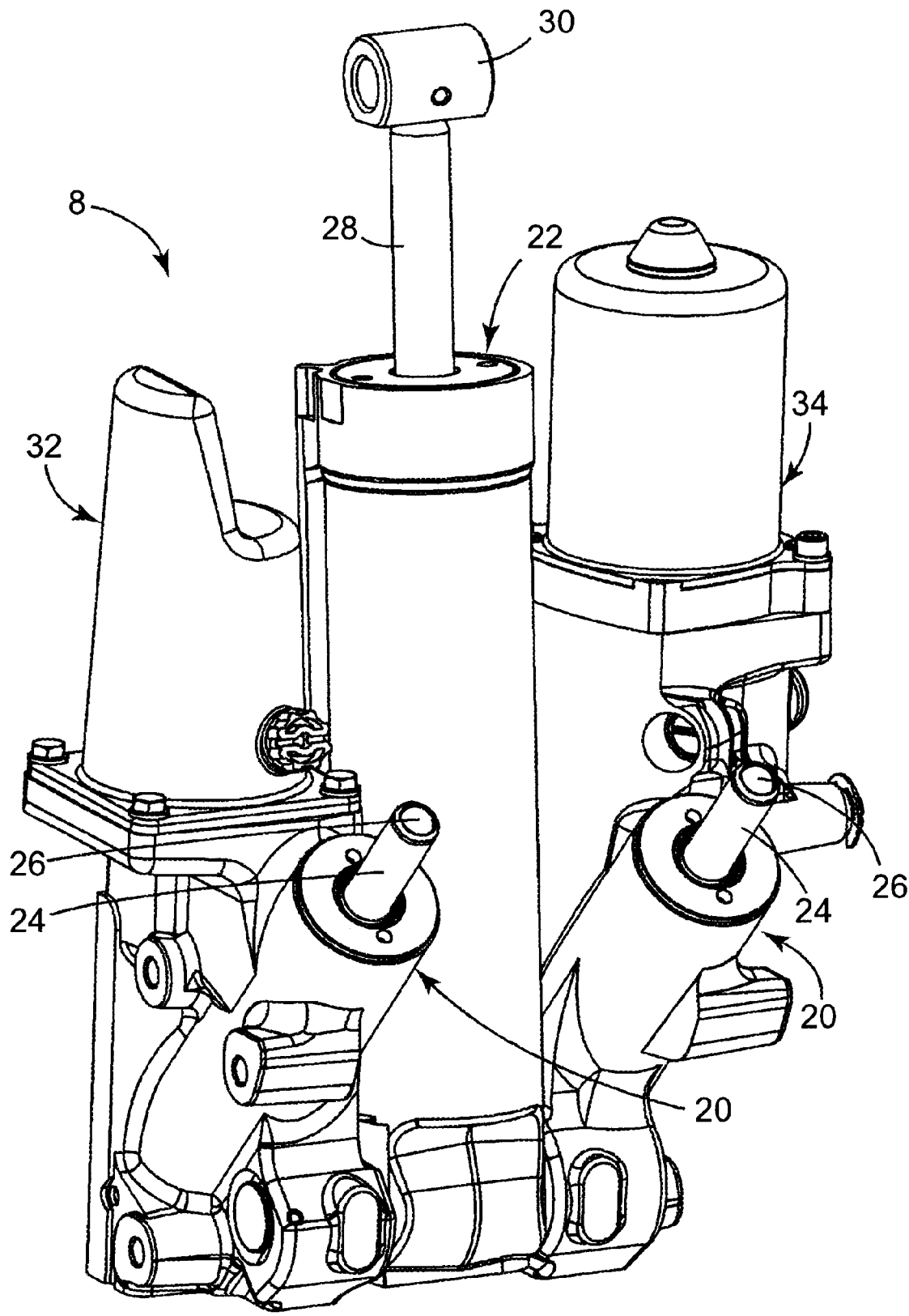
FIG. 8 is a second isometric view of the tilt and trim unit shown in FIG. 1.
Figure 9:
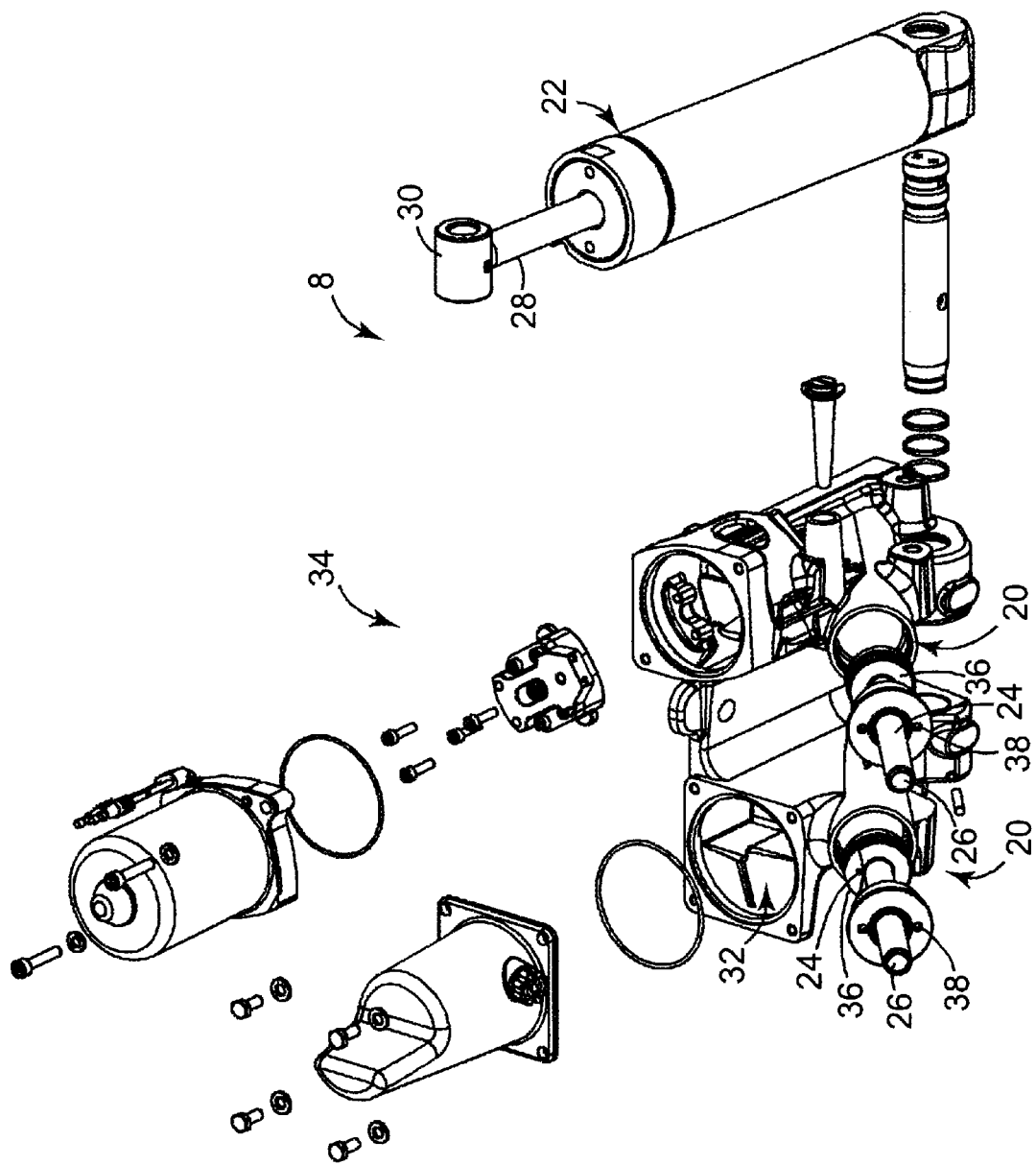
FIG. 9 is an exploded isometric view of the tilt and trim unit shown in FIGS. 7 and 8.

FIGS. 2 and 3 are detailed illustrations of the tilt cylinder rods 24. A piston 36 is located at the base of the rod 24. The end of the rod 24 with the bearing 26 extends from the tilt cylinder 20 through an end seal 38.

The polymer ball seat 10 can be described with reference to FIGS. 3–6. As shown, seat 10 is sized to fit within a recess in the end of the rod 24 and has a concave bearing-receiving surface 40 on which the bearing 26 can roll. The bearing 10 can be mounted within the end of the rod 24 using conventional or otherwise known approaches such as swaging to hold the bearing and seat in the rod. Bearing seat 10 can be fabricated from any of a wide variety of polymers. In one embodiment, the bearing seat 10 is fabricated from Ryton, BR42B, a polyphenylene sulfide (PPS) which is commercially available from Philips Petroleum of Bartlesville, Okla.

Trim cylinders including polymer ball seats in accordance with the present invention offer considerable advantages. In particular, the polymer ball seat allows the bearing to roll smoothly under a wide range of environmental conditions to which the tilt and trim unit can be exposed during operation. The seat is resistant to the effects of corrosion and drying which can otherwise interfere with the operation of the bearing. Undesirable chatter during trim operations is thereby reduced.

Although the present invention has been described with reference to preferred embodiments, those skilled in the art will recognize that changes can be made in form and detail without departing from the spirit and scope of the invention.

What is claimed is:

1. A marine engine hydraulic trim cylinder, including:
    a marine engine trim cylinder rod having an end;
    a marine engine trim cylinder polymer ball seat at the end of the trim cylinder rod; and
    a marine engine trim cylinder ball bearing capable of unconstrained rolling motion in the polymer ball seat when engaged with a marine engine mount.

2. A marine engine hydraulic tilt and trim system including the trim cylinder of claim 1.

3. A boat including the hydraulic trim cylinder of claim 1.

4. The hydraulic trim cylinder of claim 1 wherein the ball seat is formed of polyphenylene sulfide.

* * * * *